(12) United States Patent
Mitchell

(10) Patent No.: US 10,368,104 B1
(45) Date of Patent: Jul. 30, 2019

(54) SYSTEMS AND METHODS FOR TRANSMISSION OF SYNCHRONIZED PHYSICAL AND VISIBLE IMAGES FOR THREE DIMENSIONAL DISPLAY

(71) Applicant: James P. Mitchell, Cedar Rapids, IA (US)

(72) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 626 days.

(21) Appl. No.: 14/676,014

(22) Filed: Apr. 1, 2015

(51) Int. Cl.
*G06T 17/20* (2006.01)
*H04N 19/625* (2014.01)
*H04N 19/44* (2014.01)
*H04N 19/124* (2014.01)
*G06K 9/00* (2006.01)
*G06T 9/00* (2006.01)

(52) U.S. Cl.
CPC ....... *H04N 19/625* (2014.11); *G06K 9/00335* (2013.01); *G06T 9/001* (2013.01); *H04N 19/124* (2014.11); *H04N 19/44* (2014.11)

(58) Field of Classification Search
CPC ...... G06T 17/20; G06T 9/001; G06K 9/00335
USPC ....................................................... 345/423
See application file for complete search history.

(56) References Cited

U.S. PATENT DOCUMENTS

| | | | |
|---|---|---|---|
| 5,768,423 A * | 6/1998 | Aref .................. | G06K 9/00879 382/228 |
| 6,262,737 B1 * | 7/2001 | Li ......................... | G06T 17/20 345/419 |
| 6,563,500 B1 * | 5/2003 | Kim ....................... | G06T 9/001 345/419 |
| 7,054,478 B2 * | 5/2006 | Harman ................. | G06T 9/001 382/154 |
| RE39,342 E * | 10/2006 | Starks ................ | G02B 27/2207 345/419 |
| 7,831,087 B2 * | 11/2010 | Harville ............. | G06K 9/00201 382/103 |
| 8,212,840 B2 * | 7/2012 | Jiao ....................... | G06T 15/005 345/419 |
| 8,421,804 B2 * | 4/2013 | Ostermann ............. | G06T 9/001 345/473 |
| 9,092,906 B2 * | 7/2015 | Yu .......................... | G06T 15/40 |
| 9,536,345 B2 * | 1/2017 | Krig ....................... | G06T 15/04 |

(Continued)

OTHER PUBLICATIONS

A progressive view-dependent technique for interactive 3-D mesh transmission; Sheng; 2004.*

(Continued)

*Primary Examiner* — Luis Perez-Fuentes
(74) *Attorney, Agent, or Firm* — Angel N. Gerdzhikov; Donna P. Suchy; Daniel M. Barbieri

(57) ABSTRACT

Systems and methods for transmission and display of synchronized physical and visual data for three-dimensional display are disclosed. Physical and visual data may be encoded and interlaced to enable synchronized transmission of the data in efficient manners. A single data transport stream may be utilized to transmit both physical and visual data over a communication channel, allowing physical and visual data to be efficiently co-joined on a same surface at a receiving end to provide a realistic, true three-dimensional representation.

16 Claims, 9 Drawing Sheets

(56) References Cited

U.S. PATENT DOCUMENTS

| | | | |
|---|---|---|---|
| 2004/0155990 A1* | 8/2004 | Leoniak | G06K 7/1095 349/6 |
| 2009/0174710 A1* | 7/2009 | Sim | G06K 9/00201 345/420 |
| 2010/0054579 A1* | 3/2010 | Okutomi | G01C 11/06 382/154 |
| 2010/0295783 A1* | 11/2010 | El Dokor | G06F 3/017 345/158 |
| 2010/0310157 A1* | 12/2010 | Kim | G06K 9/00335 382/159 |
| 2011/0038418 A1* | 2/2011 | Pandit | G06T 9/001 375/240.16 |
| 2013/0187915 A1* | 7/2013 | Lee | G06T 9/001 345/420 |
| 2014/0092439 A1* | 4/2014 | Krig | G06T 9/001 358/2.1 |
| 2014/0176535 A1* | 6/2014 | Krig | G06T 15/04 345/419 |
| 2016/0255327 A1* | 9/2016 | Cole | G06F 3/012 348/43 |

OTHER PUBLICATIONS

Google Search for NPL; 2019. (Year: 2019).*
A progressive view-dependent technique for interactive 3-D mesh transission; Sheng; (Year: 2004).*
Enhanced methods for efficient visualization of multimedia contents; Son; (Year: 2004).*
An MPEG-4 facial animation system driven by synthetic speech; Lande; (Year: 1998).*
Sheng Yang et al., A Progressive View-Dependent Technique for Interactive 3-D Mesh Transmission, IEEE Transactions on Circuits and Systems for Video Technology, vol. 14, No. 11, Nov. 2004, p. 1249-1264.
Ewaryst Tkacz (Eds.) et al., Internet-Technical Development and Applications, AISC 64, Chapter 5: Modeling of Internet 3D Traffic Using Hidden Markov Models, pp. 37-43, © Springer-Verlag Berlin Heidelberg 2009.

* cited by examiner

SYSTEMS AND METHODS FOR TRANSMISSION OF SYNCHRONIZED PHYSICAL AND VISIBLE IMAGES FOR THREE DIMENSIONAL DISPLAY

BACKGROUND

Traditional two-dimensional (2D) displays present 2D images, which are not capable of providing three-dimensional (3D) immersive experiences. Display techniques known as stereo displays (commonly referred to as 3D displays) utilize stereopsis for binocular vision to provide illusionary solutions to convey depth perceptions to the viewers. However, stereo displays do not physically render 3D objects and lack certain interactive attributes only provided by physically rendering 3D objects.

SUMMARY

An embodiment of the inventive concepts disclosed herein is directed to a method. The method may include: obtaining physical data and visual data of at least one portion of an object; encoding the physical data into a sequence of object frames, wherein each object frame represents a set of time-specific physical attributes of the at least one portion of the object; encoding the visual data into a sequence of image frames, wherein each image frame represents a time-specific visual representation of the at least one portion of the object; synchronizing and interlacing the sequence of object frames and the sequence of image frames to produce an interlaced data stream; and transmitting the interlaced data stream via a communication channel to a display device.

An additional embodiment of the inventive concepts disclosed herein is directed to a system. The system may include one or more processors. The one or more processors may be configured to encode physical data representing at least one portion of an object into a sequence of object frames, wherein each object frame represents a set of time-specific physical attributes of the at least one portion of the object. The one or more processors may also be configured to encode visual data representing the at least one portion of the object into a sequence of image frames, wherein each image frame represents a time-specific visual representation of the at least one portion of the object. The one or more processors may be further configured to synchronize and interlace the sequence of object frames and the sequence of image frames to produce an interlaced data stream. The system may also include at least one transmitter configured to transmit the interlaced data stream via a communication channel to a display device.

A further embodiment of the inventive concepts disclosed herein is directed to a system. The system may include at least one receiver configured to receive an interlaced data stream via a communication channel. The system may also include at least one processor configured to decode the interlaced data stream to produce decoded physical data and decoded visual data. The decoded physical data may represent at least one portion of an object as a sequence of object frames, wherein each object frame represents a set of time-specific physical attributes of the at least one portion of the object. The decoded visual data may represent the at least one portion of the object as a sequence of image frames, wherein each image frame represents a time-specific visual representation of the at least one portion of the object. The system may further include a display device configured to provide a three-dimensional representation of the at least one portion of the object based on the sequence of object frames and the sequence of image frames.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which.

DETAILED DESCRIPTION

Reference will now be made in detail to exemplary embodiments of the inventive concepts disclosed herein, examples of which are illustrated in the accompanying drawings.

As display technologies evolve, concepts for providing display devices that can physically render 3D objects have been developed. However, problems associated with techniques for efficiently transmitting physical data along with visual data still need to be addressed in order to fully utilize the potentials of such display devices. Without techniques for efficiently transmitting physical and visual data, the physical and visual data in their natural state would require large amounts of bandwidth to faithfully reproduce in real-time through a communication channel, significantly limiting the applicability of the display devices.

Embodiments in accordance with the inventive concepts disclosed herein are directed to systems and methods for transmission and display of synchronized physical and visual data. In some embodiments, physical and visual data may be encoded (compressed) and interlaced to enable synchronized transmission of the data in efficient manners. A single data transport stream may be utilized to transmit both physical and visual data over a communication channel, allowing physical and visual data to be efficiently co-joined on a same surface at a receiving end to provide a realistic, true 3D representation.

Figure 1:
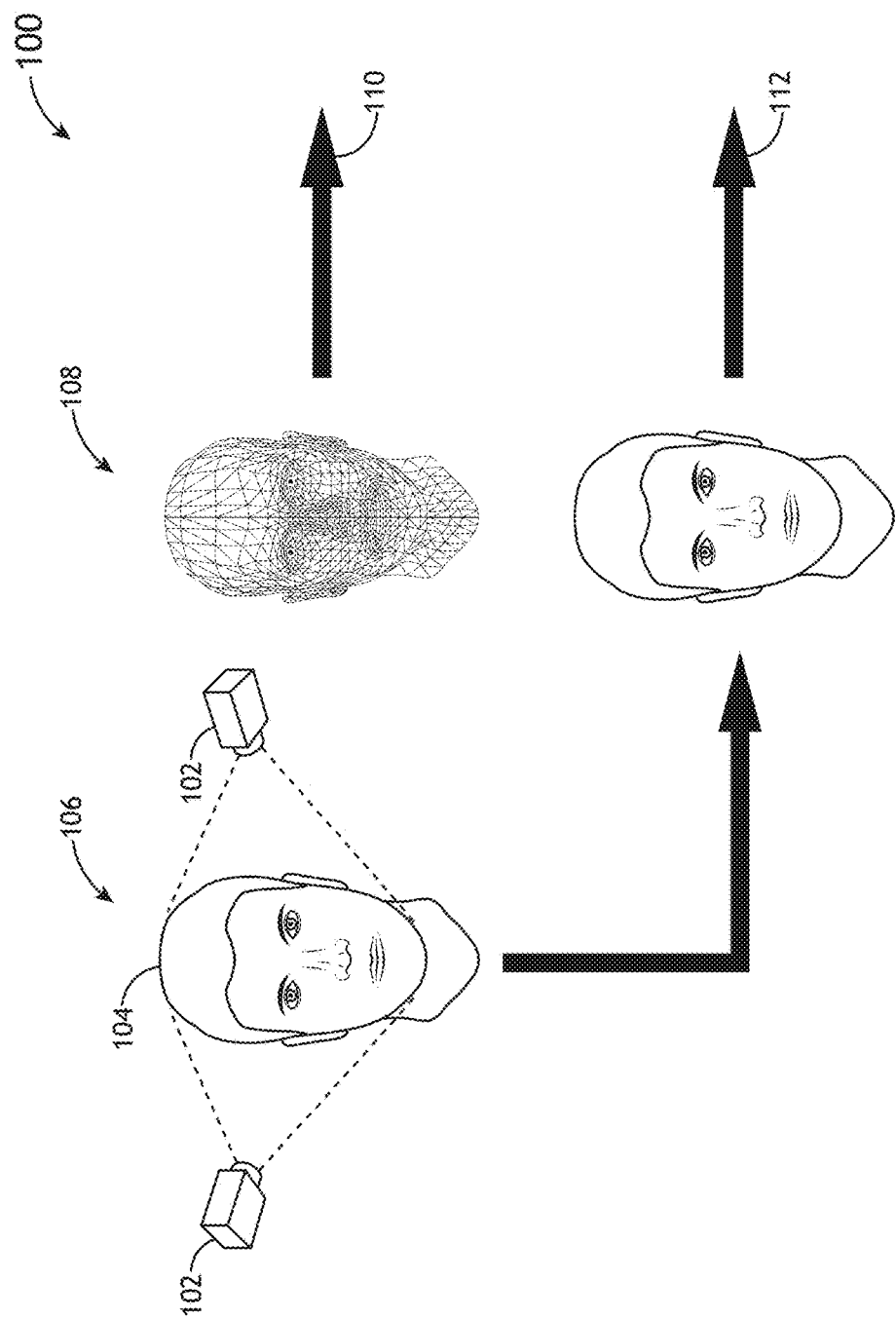
FIG. 1 is an illustration depicting method steps and devices for obtaining and encoding physical and visual data.

Referring generally to FIGS. 1-5, an embodiment of a method 100 for transmitting physical and visual data is shown. More specifically, as shown in FIG. 1, one or more 3D scanners 102 may be utilized to scan an object 104 at a transmitting end in a step 106. It is contemplated that various types of 3D scanners 102 capable of obtaining 3D attributes (may also be referred to as physical data) of the object 104 may be utilized. For instance, physical data of the object 104 may be obtained using stereoscopic scanning, non-touch laser scanning, touch sensing, (ultra-wideband) radar sensing, short wavelength sensing (millimeter, micrometer, or nanometer radars), time-of-flight sensing, mass density mapping, magnetic/electromagnetic resonance mapping, as well as other types of 3D scanning techniques. It is contemplated that physical data obtained utilizing the 3D scanners 102 may include, but is not limited to, external feature measurements, internal feature measurements, width, height, depth, as well as other physical attributes of the object 104.

It is to be understood that while the object 104 depicted in FIG. 1 may include a person, such a depiction is merely exemplary. The object 104 may include a person, a building, a terrain, a weather (e.g., a cloud formation), or various types of items of interest without departing from the broad scope of the inventive concepts disclosed herein. It is also contemplated that while one or more 3D scanners 102 may be utilized to obtain the physical attributes of the object 104, the physical attributes of the object 104 may also be digitally defined utilizing 3D modeling tools instead of using scanners. 3D modeling tools may be useful for defining physical attributes of objects that may be difficult to scan (e.g., too big or too small), or that may not physically exist (e.g., to facilitate a true 3D rendering of a product design or a synthetic computer generated object).

Figure 2:
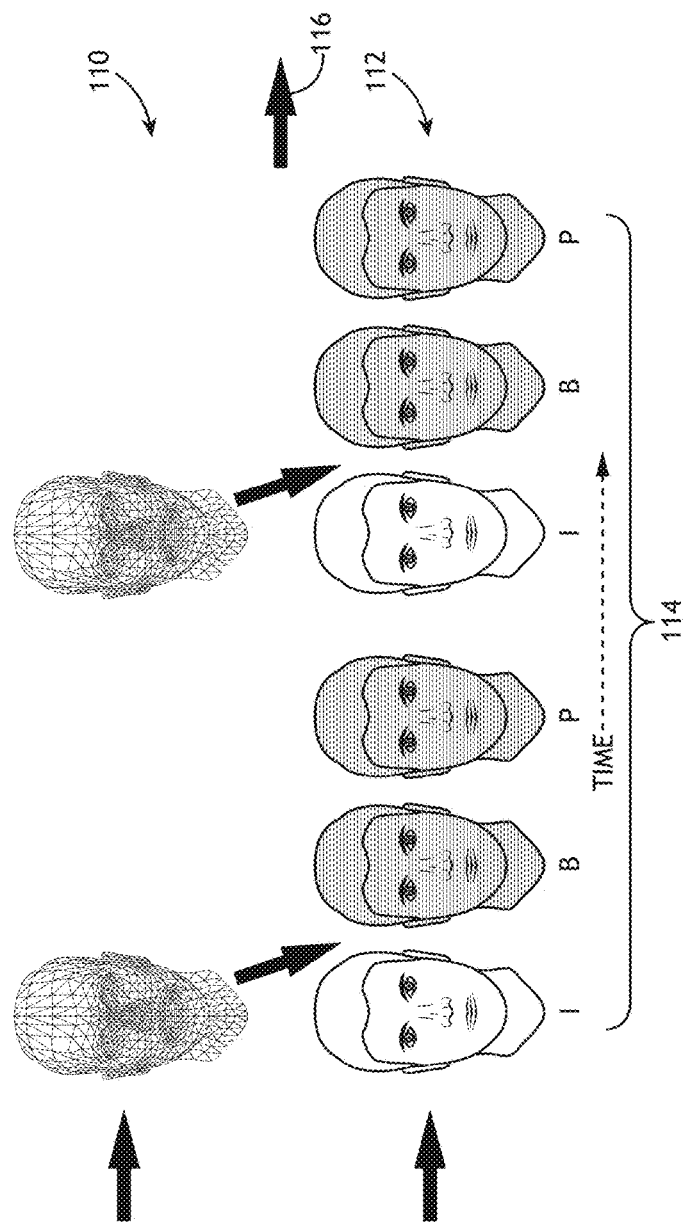
FIG. 2 is an illustration depicting method steps for interlacing the physical and visual data.

It is also contemplated that visual data (e.g., photographic images or videos) of the object 104 may be obtained substantially simultaneously with the physical data. The obtained visual and physical data may then be encoded in a step 108. As depicted in FIGS. 1 and 2, visual data of the object 104 may be encoded utilizing encoding and/or compression techniques such as those established by Moving Picture Experts Group (MPEG) based on the discrete cosine transform (DCT) process or various other image/video compression and transmission techniques. Encoded visual data may be generally referred to as image frames 112. On the other hand, physical data of the object 104 may be encoded into object frames 110. Each object frame 110 may include object vectors in a vector space, representing 3D wireframe geometric shapes (e.g., vector quantized data), which in turn may represent 3D structures of the scanned object 104 for a given time instance.

It is contemplated that utilizing vector quantized (VQ) data, such as VQ triangles, to facilitate transmission of the physical data may provide several advantages. For instance, VQ data consumes relatively low bandwidth. In addition, resolution of an object (e.g., the object 104 in the example above) represented using VQ data may be efficiently scaled down (e.g., using more coarse VQ triangles) or scaled up (e.g., using finer VQ triangles) based on bandwidth availability, allowing the object vectors to be scalable and/or adaptive to a given (or changing) operating environment. Further, research has shown that VQ data may be transported as a representation of hidden Markov model (HMM) derived vectors, which is also scalable in resolution and is channel efficient. Utilizing VQ data in this manner may allow a transmitter to simply transmit or broadcast the VQ data at its highest resolution and let a receiver at a receiving end to process and scale the resolution of the VQ data as necessary. It is to be understood, however, that the VQ data is not required to be transmitted at its highest resolution, and specific implementations may vary the resolution without departing from the broad scope of the inventive concepts disclosed herein.

Figure 3:
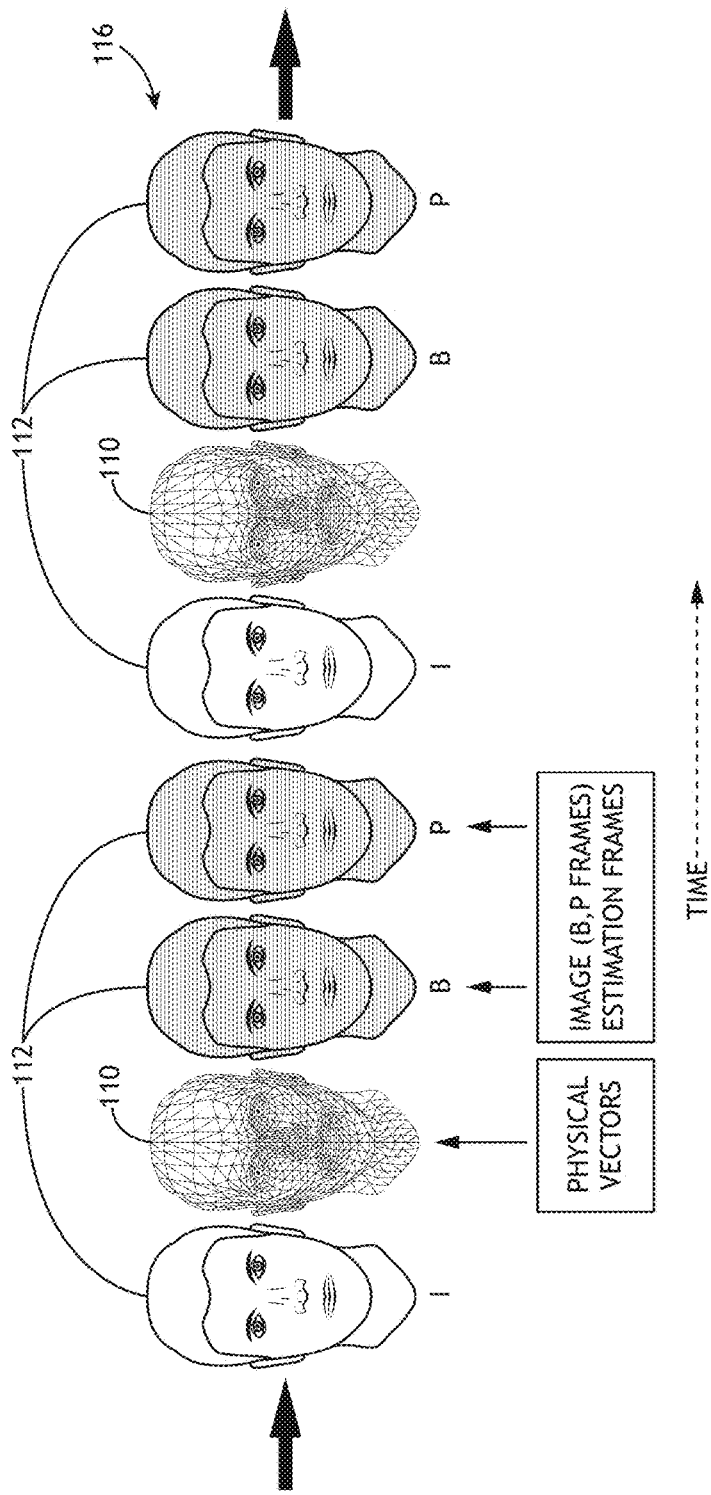
FIG. 3 is an illustration depicting method steps for transmitting the interlaced physical and visual data.

It is contemplated that encoded visual data (i.e., image frames 112) and encoded physical data (i.e., object frames 110) may be interlaced to produce a single data stream 116 that synchronizes and registers both the image frames 112 and the object frames 110. FIGS. 2 and 3 depict an exemplary step 114 for interlacing the image frames 112 and the object frames 110. More specifically, three major frame types, I, P, and B frames, are commonly used in the field of video compression. I-frames are the least compressible frames but they do not require other video frames to decode. P-frames may use data from previous frames to decompress and are more compressible than I-frames. B-frames may use both previous and forward frames for data reference to get the highest amount of data compression. In the example depicted in FIGS. 2 and 3, an object frame 110 representing the physical attributes of the object 104 at a specific time instance may be provided for every I-frame present in the image frames 112. In other words, this example illustrates sequentially capturing and encoding physical attributes of the object 104 into object frames 110 as a time-specific data sequence, and sequentially inserting the object frames 110 as ancillary to a time-specific sequence of image frames 112.

It is to be understood that while the example depicted in FIGS. 2 and 3 illustrates inserting one object frame 110 substantially synchronously with each I-frame present in the image frames 112, such a configuration is not required. In some embodiments, for example, the number of object frames may be determined based on bandwidth availability. For instance, with sufficient bandwidth, additional object frames 110 may be provided with certain B-frames and/or P-frames. On the other hand, object frames 110 may be provided for every n number of I-frames to reduce bandwidth consumption, if needed.

It is also to be understood that while the object frames 110 may be inserted immediately after their corresponding image frames 112 as shown in FIGS. 2 and 3, their specific locations are merely exemplary. The object frames 110 may be inserted either in front of or behind their corresponding image frames 112 without departing from the broad scope of the inventive concepts disclosed herein. It is also noted that while I, P, and B frames are referenced in the examples described above, the image frames 112 may not be limited to I, P, and B frames, and that the interlacing step 114 may interlace object frames 110 and various types of image frames 112 without departing from the broad scope of the inventive concepts disclosed herein.

Figure 4:
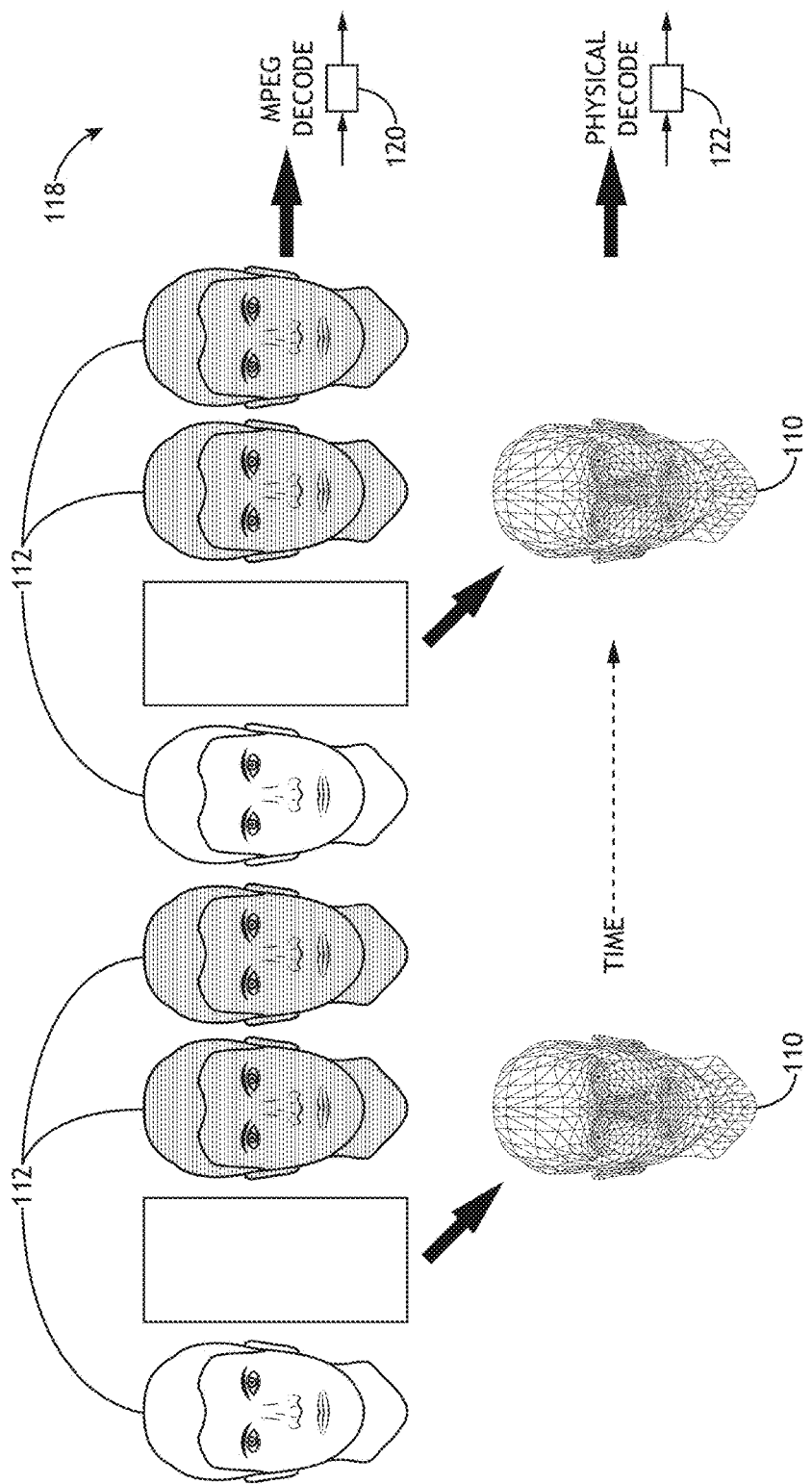
FIG. 4 is an illustration depicting method steps and devices for receiving and decoding the interlaced physical and visual data.

It is contemplated that the interlaced data stream 116 may be transmitted to a receiver as a single data stream over a communication channel. At least two decoding processes may be performed at the receiving end to decode the interlaced data stream 116. FIG. 4 depicts an exemplary step 118 for decoding the interlaced data stream 116. More specifically, a first (visual) decoder 120 may be utilized to decode the image frames 112 in order to obtain the visual data of the object 104. The visual decoder 120 may decode the image frames 112 in a manner similar to conventional video decoders (e.g., a MPEG decoder if MPEG is used for encoding), with an exception that object frames 110 included in the interlaced data stream 116 may be bypassed/ ignored by the visual decoder 120. Similarly, a second (object) decoder 122 may bypass/ignore the image frames 112 included in the interlaced data stream 116 and only decode the object frames 110 in order to obtain the physical data of the object 104.

It is contemplated that the bandwidth of the communication channel utilized to transmit the interlaced data stream 116 may vary. Because the synchronized and interlaced physical and visual data transmission techniques described herein consume relatively low bandwidth and are robust and scalable, they may enable physical and visual data to be efficiently provided to bandwidth constrained devices (e.g., mobile or wireless devices). Availabilities of higher bandwidths may allow high resolution data (physical and/or visual) to be transmitted and displayed. Higher bandwidths may also allow the insertion of additional video and object frames while satisfying the video frame arrival to be delivered in accordance to timing specifications of one or more video coder-decoders (codecs) utilized by the receiver.

It is also contemplated that one or more processors may be utilized to decode the interlaced data stream 116 as described above. The processors may be implemented as dedicated processing units, application-specific integrated circuits (ASIC), integrated components of existing hardware or firmware configured to control operations of a display device at the receiving end, or various other types of processing units without departing from the broad scope of the inventive concepts disclosed herein. Regardless of the specific implementations of the decoders 120 and 122, it is contemplated that the decoded physical and visual data may be utilized jointly to render a 3D representation of the object 104.

Figure 5:
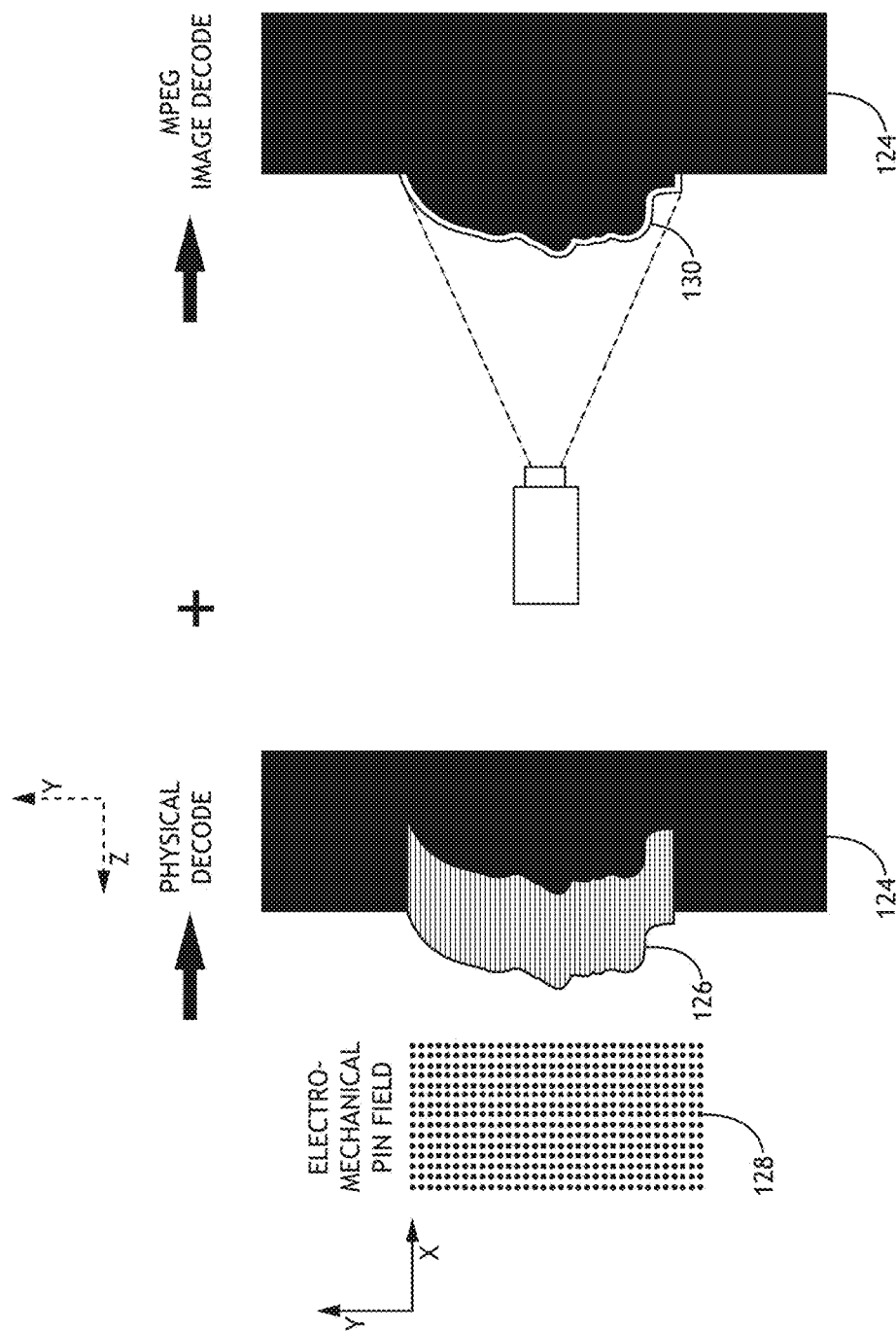
FIG. 5 is an illustration depicting method steps and devices for displaying the decoded physical and visual data.

In some embodiments, as depicted in FIG. 5, a display device 124 capable of controlling display elements 128 in a depth (z-axis) direction may set its pixel depth according to the physical data received, effectively defining a 3D surface 126 representing the physical attributes of the object 104. The 3D surface 126 may be co-joined with display of the received visual data of the object 104, effectively providing a realistic, true 3D representation of the object 104. In some embodiments, a physical image smoothing layer (membrane) 130 may be provided to improve projected image visual performance.

It is contemplated that the display device 124 may be implemented utilizing various 3D display techniques without departing from the broad scope of the inventive concepts disclosed herein. For instance, the display device 124 may include a shape-shifting display device configured to physically shift display elements 128 in a z-axis direction to form the 3D surface 126. The visual representation of the object 104 may be projected (e.g., front, rear, or both) on to the 3D surface 126, and/or alternatively, the display elements 128 may be equipped with light emitters (e.g., equipped with organic light-emitting diodes or the like) or that the membrane layer itself may include a flexible display for displaying images or videos without requiring projection. Other types of display devices, such as three-dimensional layered displays that utilize suspended excitable luminous elements defined within a volume, may also be utilized without departing from the broad scope of the inventive concepts disclosed herein. A three-dimensional layered display may selectively engage (e.g., excite or illuminate, instead of mechanically actuate) the suspended excitable luminous elements at various depth settings to form the 3D surface 126.

It is also to be understood that while display of the physical data and the visual data are correlated on the same 3D surface 126 (or membrane 130), resolution of the physical data and resolution of the visual data may differ. For instance, referring to the display device 124 shown in FIG. 5, where display elements 128 may be physically shifted to form the 3D surface 126, the resolution of the physical data may be dictated by the number and size of the display elements 128 defining the display field. The visual data, on the other hand, may be presented at a higher resolution. For example, more than one image pixels may be projected onto the surface of each individual display element 128, allowing the visual attributes to be finer resolved than the physical attributes. It is contemplated, however, that such a configuration is merely exemplary; the resolution of the physical attributes may be configured to be equal to or greater than the resolution of the visual attributes without departing from the broad scope of the inventive concepts disclosed herein.

It is also contemplated that various 3D rendering algorithms may be utilized to calculate, quantize, and/or normalize z-axis depth settings of the display elements 128. For instance, as previously described, each object frame 110 may include object vectors (e.g., VQ triangles) that represent the 3D structures of the scanned object 104. The VQ triangles may be scaled to fit the size of the display field defined by the display elements 128, the correlation between the display pixel field and the VQ triangles may then be mathematically established, their intersections may be identified, and the z-axis depth settings of the display elements 128 may be calculated accordingly based on their intersections with correlated VQ triangles to form the 3D surface 126. It is to be understood that other 3D rendering algorithms may also be utilized to facilitate forming of the 3D surface 126 without departing from the broad scope of the inventive concepts disclosed herein.

It is further contemplated that the visual attributes of the object 104 may be displayed in manners that may accommodate viewing from multiple viewing angles. For example, front, rear, top, bottom, and/or side views of the object 104 may be obtained at the transmitting end and one or more separate video (e.g., synchronized MPEG) channels over a higher bandwidth utilized to provide video data to the receiving end for display. Multiple projectors may be utilized to project the separate video channels to the front, rear, top, bottom, and/or side views on to the 3D surface 126, improving 3D physical realism and allowing a viewer at the receiving end to view the 3D rendering of the object 104 from multiple angles. Furthermore, it is contemplated that the physical attributes of the object 104 may be digitally defined utilizing 3D modeling tools instead of using scanners. 3D modeling tools may be useful for defining physical attributes of objects that may be difficult to scan (e.g., too big or too small), or that may not physically exist (e.g., to facilitate a true 3D rendering of a product design).

Figure 6:
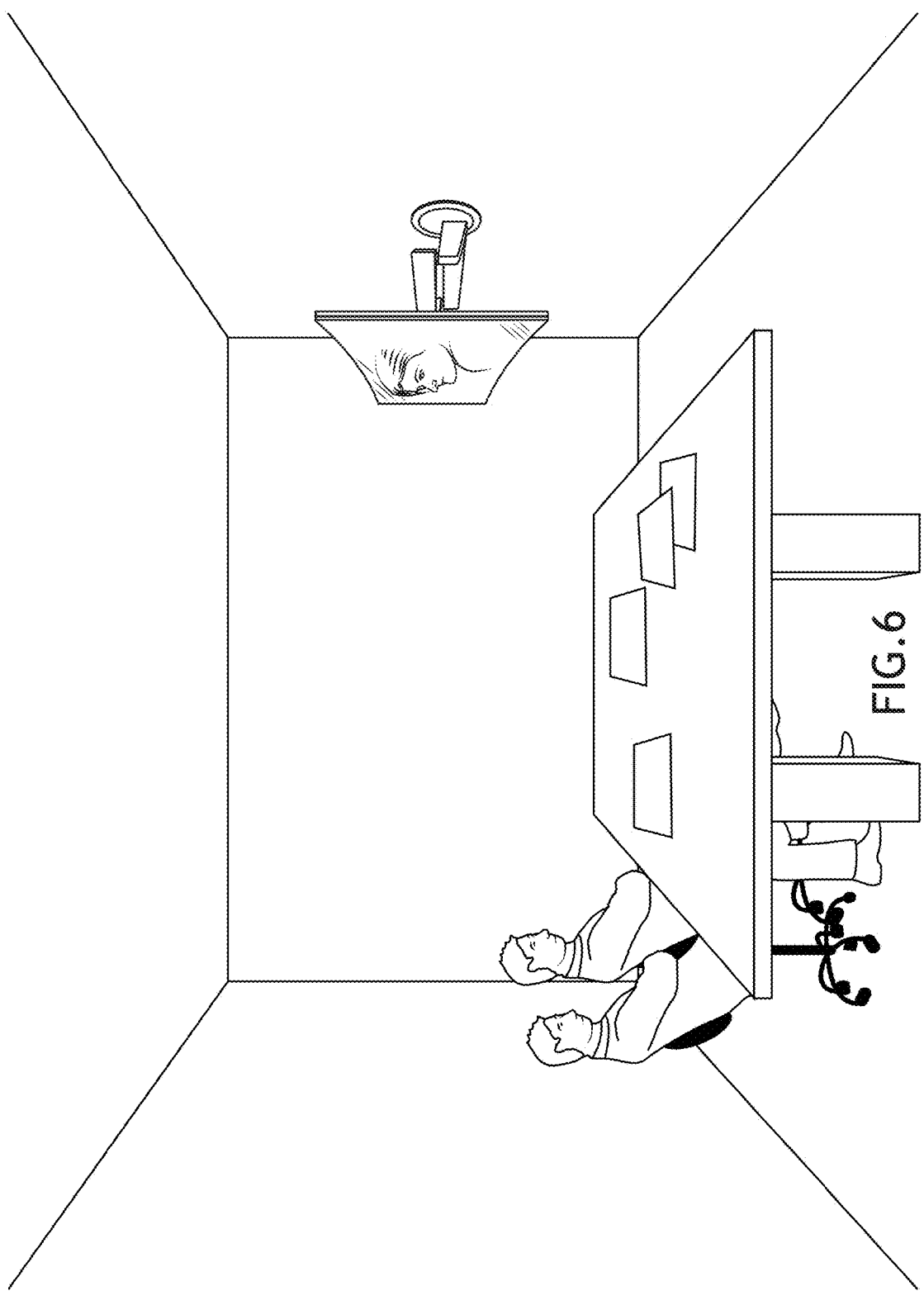
FIG. 6 is an illustration depicting an exemplary utilization of the inventive concepts disclosed herein.

It is noted that the methods and systems for obtaining, transmitting, and displaying physical and visual data as described above may be utilized in various manners without departing from the broad scope of the inventive concepts disclosed herein. For instance, as depicted in FIG. 6, teleconferencing experiences may be enhanced by enabling an attendee located at one location to appear, in real-time, in a 3D representation 600 at a different location. The 3D representation 600 of the remote attendee may turn and make eye contact with differently users on the receiving end, and may enable various other features that can enhance the teleconferencing experiences. Similarly, an object (e.g., a product prototype) presented at one location may be transmitted and displayed in a 3D representation at a different location. It is contemplated that the methods and systems in accordance with the inventive concepts disclosed herein may be useful in various other fields as well. For example, objects may be physically and visually presented from a table surface for collaborative discussions.

Figure 7:
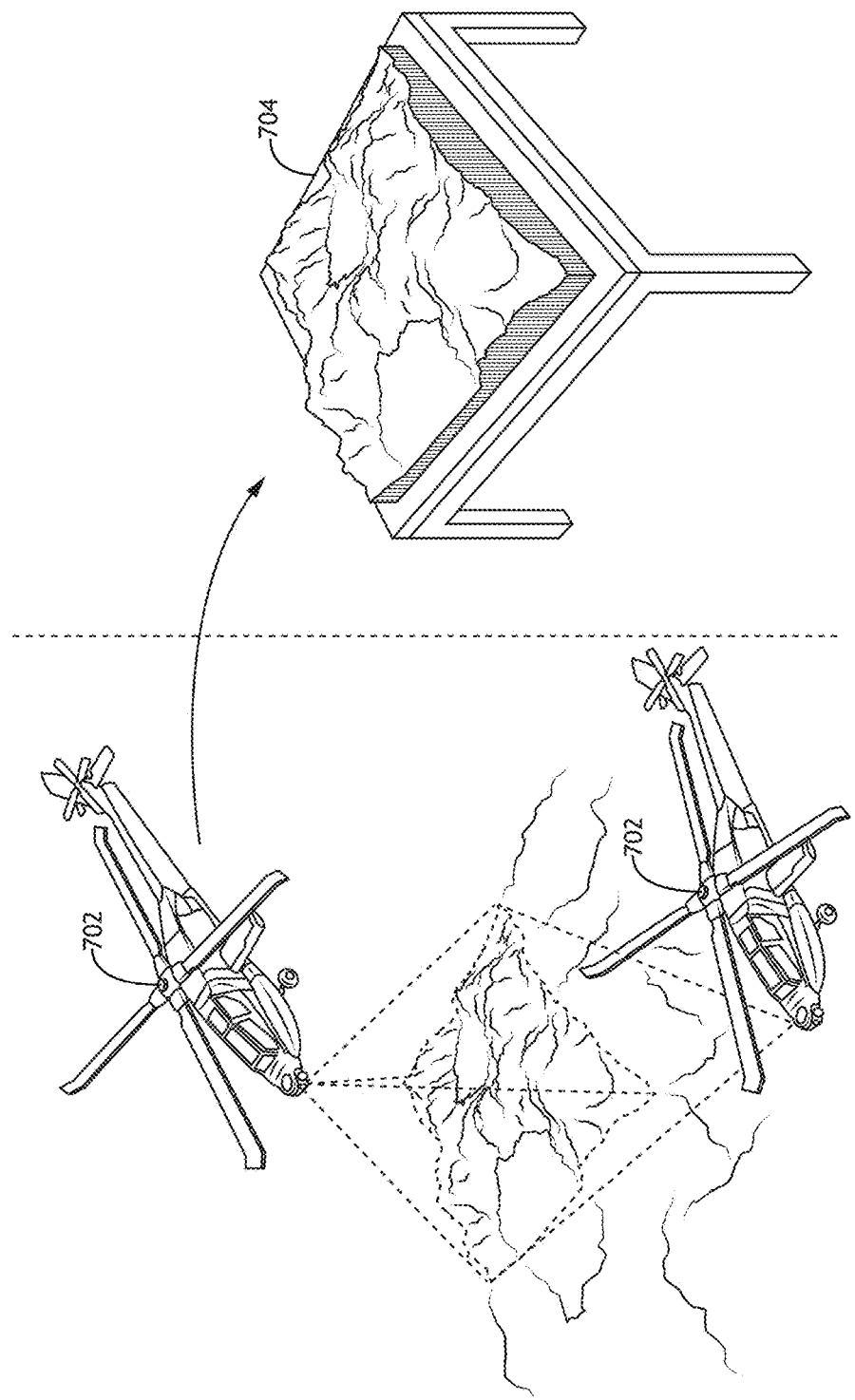
FIG. 7 is an illustration depicting another exemplary utilization of the inventive concepts disclosed herein.
Figure 8:
FIG. 8 is an illustration depicting another exemplary utilization of the inventive concepts disclosed herein.

In another example, as depicted in FIGS. 7 and 8, obtaining, transmitting, and/or displaying physical and visual data in accordance with the inventive concepts disclosed herein may help providing situational awareness in various situations. For instance, one or more video and depth sensors/scanners located on one or more aircrafts or helicopters 702 may be utilized to obtain 3D terrain data of a particular location. The image and object frames generated from these video and depth sensors/scanners may be transmitted to a 3D display device 704 located at another location (e.g., a command center or the like), effectively providing a real-time 3D synthetic vision of the terrain. Alternatively and/or additionally, previously recorded or obtained 3D terrain data may be retrieved from a database for display on the display device 704 as well. In other words, real-time data as well as recorded data may be displayed without departing from the broad scope of the inventive concepts disclosed herein.

Similarly, a 3D display device may also be utilized in a vehicle such as an aircraft or the like. FIG. 8 depicts a 3D display device 802 located on a flight deck of an aircraft. The 3D display device 802 may receive and display, for example, real-time or recorded terrain data as previously described, but may also receive and display additional information such as weather maps and the like. For example, cloud tops, precipitation intensity, wind or other images obtained from one or more spectral sensors may be displayed to help a pilot to visualize, and in turn improve the awareness of, the situation. It is contemplated such a 3D display device 802 may also be utilized in land vehicles, maritime vehicles, as well as space vehicles.

It is contemplated that the display devices 704 and 802 depicted in the examples above may be implemented utilizing various display techniques. For instance, the display device 704 (e.g., used in a command center) may be configured to project images/videos from any suitable direction(s), including the bottom for a 360 view, and may provide a 3D representation that is generally true to the ratios in the x, y, and z directions. Availabilities of higher bandwidths may also allow high resolution data (physical and/or visual) to be transmitted and displayed. The display device 802 (e.g., located on the flight deck), on the other hand, may be slight more restricted and may even have a more limited z-depth capability. The 3D representations provided using the display device 802 may therefore be presented as compressed or exaggerated in the z-dimension, but may still be sufficient to depict z-depth information in a true 3D manner as previously described. Alternatively, the z-depth capability of the display device 802 may be utilized to indicate criticality of certain information. For instance, a weather pattern of a particular concern may appear relatively exaggerated in the z-axis compared to other less concerning weather patterns. It is contemplated that the z-depth capability of the display device 802 may be utilized to improve situational awareness in various other ways as well.

Figure 9:
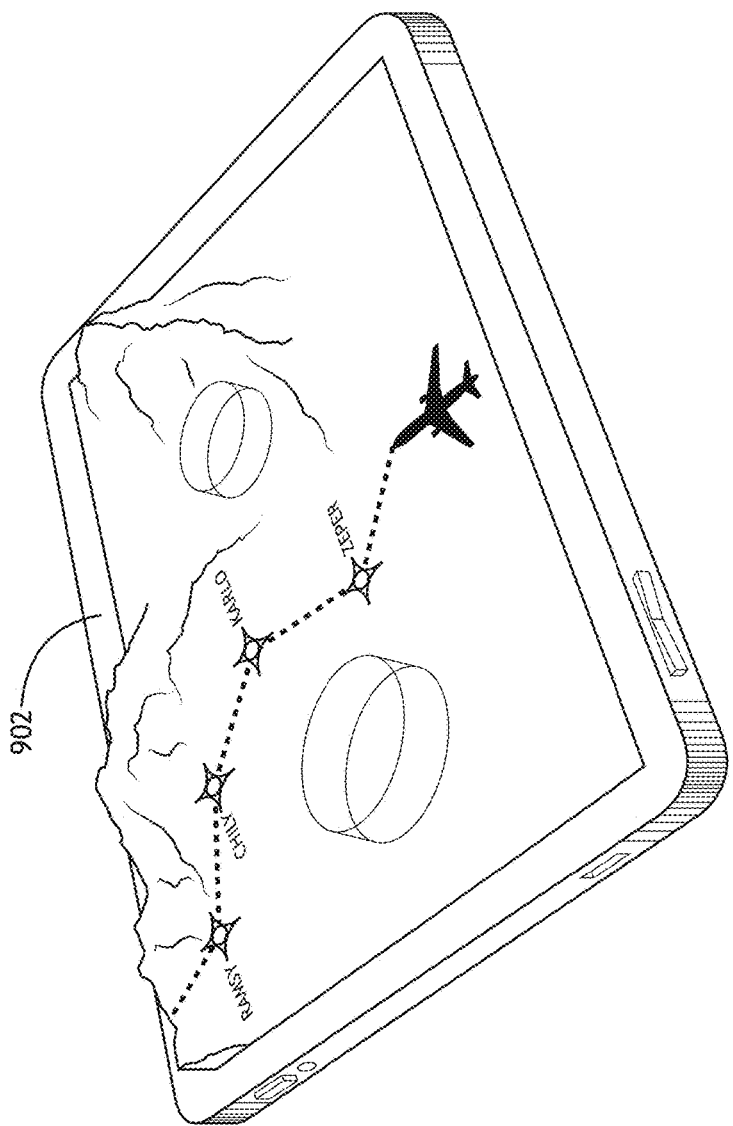
FIG. 9 is an illustration depicting another exemplary utilization of the inventive concepts disclosed herein.

FIG. 9 is an illustration showing a 3D display device 902 that may function in a similar manner as display device 802 described above, but configured to be portable. As shown in FIG. 9, an aero image showing a terrain, a projected flight path, and flight restrictions along the flight path may be presented in a 3D representation. It is contemplated that the terrain features (and other concerns) may be obtained from a database or sensed/received in real-time. As the aircraft travels along the flight path, the 3D representation may be updated accordingly and certain terrain features (e.g., mountains) and other concerns (e.g., flight restrictions) may appear in the z-axis to enhance visualization and to raise the pilot's situational awareness.

It is also contemplated that a 3D representation provided on a 3D display device may be dynamically adjusted to optimize viewing. For instance, a viewer's head position, gaze angle, and/or movements may be tracked and utilized to adjust the 3D representation provided on the 3D display device. In some embodiments, as the viewer's gaze angle changes, the 3D representation may move across the display, or may be rotated to follow the viewer's gaze angle or movements. In addition, a 3D display device may also be configured to optimize viewing for two or more viewing angles. For example, if two viewers (e.g., pilots) sitting in a cockpit are viewing the same 3D display device located between them, the 3D display device may be configured to show two perspective-angled representations of the same object (e.g., a terrain map) so that both viewers would view the representation of the object as looking at them head on. It is contemplated that other 3D display techniques may also be implemented without departing from the broad scope of the inventive concepts disclosed herein.

It is further contemplated that the techniques described above may help providing 3D immersive experiences that may be appreciated for various purposes. For example, a simulation room may utilize one or more 3D display devices to provide 3D representations of various scenarios, which may be utilized for training, exercising and/or gaming purposes. In addition, techniques for obtaining, transmitting, and/or displaying physical and visual data as disclosed herein may be appreciated in theaters, simulators (e.g., aviation simulators), virtual reality systems, stereoscopic optical systems (including head mounted optical systems) and the like. Furthermore, because the synchronized and interlaced physical and visual data transmission techniques described herein consume relatively low bandwidth and are robust and scalable, they may enable physical and visual data to be efficiently provided to bandwidth constrained devices (e.g., mobile or wireless devices) to facilitate 3D transmission and/or viewing utilizing such devices as well.

It is to be understood that while specific references to image data and image frames were made in the examples above, such references are exemplary and are not intended to exclude audio data. It is contemplated that video encoders/decoders (e.g., MPEG encoders/decoders or the like) utilized for encoding/decoding the image frames 112 as described above may be utilized for encoding/decoding audio data as well, without departing from the broad scope of the inventive concepts disclosed herein.

It is to be understood that the present disclosure may be conveniently implemented in forms of a software, hardware or firmware package. Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is to be understood that embodiments of the inventive concepts described in the present disclosure are not limited to any underlying implementing technology. Embodiments of the inventive concepts of the present disclosure may be implemented utilizing any combination of software and hardware technology and by using a variety of technologies without departing from the broad scope of the inventive concepts or without sacrificing all of their material advantages.

It is to be understood that the specific order or hierarchy of steps in the processes disclosed is an example of exemplary approaches. It is to be understood that the specific order or hierarchy of steps in the processes may be rearranged while remaining within the broad scope of the present disclosure. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form hereinbefore described being merely an explanatory embodiment thereof, it is the intention of the following claims to encompass and include such changes.

What is claimed is:

1. A method, comprising:
    obtaining physical data and visual data of at least one portion of an object, the physical data comprising vector quantized data in the form of hidden Markov model derived vectors;
    encoding the physical data into a sequence of object frames, wherein each object frame represents a set of time-specific physical attributes of the at least one portion of the object;
    encoding the visual data into a sequence of image frames, wherein each image frame represents a time-specific visual representation of the at least one portion of the object;
    synchronizing and interlacing the sequence of object frames and the sequence of image frames to produce an interlaced data stream;
    transmitting the interlaced data stream via a communication channel to a display device;
    decoding the interlaced data stream by bypassing every object frame in the interlaced data stream to produce a visual data stream;
    decoding the interlaced data by bypassing every image frame in the interlaced data stream to produce a physical data stream;
    configuring the display device according to the decoded physical data to form a three-dimensional surface by deflecting each pin in an electro-mechanical pin field to a z-depth defined by the physical data; and
    presenting the decoded visual data on the three-dimensional surface.

2. The method of claim 1, wherein the vector quantized data comprises a set of vector quantized triangles.

3. The method of claim 1, wherein the sequence of image frames comprises at least:
    a first type of image frame decodable without utilizing another image frame, wherein at least one of the sequence of object frames is synchronized and interlaced with the first type of image frames of the sequence of image frames.

4. The method of claim 3, wherein the sequence of image frames further comprises at least:
    a second type of image frame decodable based on at least one other image frame, wherein at least one of the sequence of object frames is synchronized and interlaced with the second type of image frames of the sequence of image frames.

5. The method of claim 1, wherein the physical data is obtained by at least periodically scanning the at least one portion of the object utilizing at least one scanning device capable of obtaining three-dimensional attributes.

6. The method of claim 1, wherein the display further comprises an image smoothing membrane.

7. The method of claim 1, wherein the decoded physical data includes the sequence of object frames, wherein each object frame comprises a set of vector quantized triangles, and wherein said configuring the display device according to the decoded physical data to form the three-dimensional surface comprises:
    calculating a depth (z-axis) dimension of the display device based on the set of vector quantized triangles.

8. A system, comprising:
    at least one processor configured to:
        encode physical data representing at least one portion of an object into a sequence of object frames, wherein each object frame comprises vector quantized data in the form of hidden Markov model derived vectors representing a set of time-specific physical attributes of the at least one portion of the object;
        encode visual data representing the at least one portion of the object into a sequence of image frames, wherein each image frame represents a time-specific visual representation of the at least one portion of the object;
        synchronize and interlace the sequence of object frames and the sequence of image frames to produce an interlaced data stream;
    at least one transmitter configured to transmit the interlaced data stream via a communication channel to a display device;
        decode the interlaced data stream by bypassing every object frame in the interlaced data stream to produce a visual data stream;
        decode the interlaced data by bypassing every image frame in the interlaced data stream to produce a physical data stream;
        configure the display device according to the decoded physical data to form a three-dimensional surface by deflecting each pin in an electro-mechanical pin field to a z-depth defined by the physical data; and
        present the decoded visual data on the three-dimensional surface.

9. The system of claim 8, wherein the sequence of image frames comprises at least a first type of image frame decodable without utilizing another image frame, wherein at least one of the sequence of object frames is synchronized and interlaced with the first type of image frames of the sequence of image frames.

10. The system of claim 8, wherein the physical data is obtained by at least periodically scanning the at least one portion of the object utilizing at least one scanning device capable of obtaining three-dimensional attributes.

11. A system, comprising:
    at least one receiver configured to receive an interlaced data stream via a communication channel;
    at least one processor configured to:
        decode the interlaced data by bypassing every object frame in the interlaced data stream to produce a visual data stream; and decode the interlaced data by bypassing every image frame in the interlaced data stream to produce a physical data stream, wherein:

the decoded physical data comprising vector quantized data in the form of hidden Markov model derived vectors representing at least one portion of an object as a sequence of object frames, wherein each object frame represents a set of time-specific physical attributes of the at least one portion of the object; and the decoded visual data represents the at least one portion of the object as a sequence of image frames, wherein each image frame represents a time-specific visual representation of the at least one portion of the object; and a display device configured to provide a three-dimensional representation of the at least one portion of the object based on the sequence of object frames and the sequence of image frames.

12. The system of claim 11, wherein the display device is configured to form a three-dimensional surface according to the sequence of object frames and present the sequence of image frames on the three-dimensional surface to provide the three-dimensional representation of the at least one portion of the object.

13. The system of claim 12, wherein each object frame of the sequence of object frames comprises a set of vector quantized triangles, and wherein the display device is configured to calculate a depth (z-axis) dimension of the display device based on the set of vector quantized triangles.

14. The system of claim 12, wherein the display device is configured to present the sequence of image frames on the three-dimensional surface by at least one of:

projecting the sequence of image frames onto the three-dimensional surface; and displaying the sequence of image frames utilizing display elements that conform to the three-dimensional surface.

15. The system of claim 11, wherein the display device is utilized to provide at least one of: a remote presence of the object, a display of a situation containing the object, and a representation of the object in a virtual reality.

16. The system of claim 11, wherein the display device includes at least one of: a stationary display device and a mobile display device.

\* \* \* \* \*